United States Patent [19]

Ehrke

[11] 4,183,398

[45] Jan. 15, 1980

[54] HEATING AND AIR-CONDITIONING SYSTEM

[75] Inventor: Rainer Ehrke, Schopfheim, Fed. Rep. of Germany

[73] Assignee: Rosenmund AG, Liestal, Switzerland

[21] Appl. No.: 873,682

[22] Filed: Jan. 30, 1978

[30] Foreign Application Priority Data

Oct. 6, 1977 [CH] Switzerland ............ 12256/77

[51] Int. Cl.² ............................................. F24D 5/10
[52] U.S. Cl. ....................................... 165/53; 126/429; 165/7; 165/59; 126/431
[58] Field of Search ................. 165/6, 7, 48, 53, 54, 165/55, 56, 57, 59; 52/171; 98/96, 99 R, 31; 237/1 A; 126/270

[56] References Cited

U.S. PATENT DOCUMENTS

| | | | |
|---|---|---|---|
| 1,467,005 | 9/1923 | Lawrence | 237/1 A |
| 3,456,718 | 7/1969 | De Fries | 165/10 |
| 3,590,913 | 7/1971 | Tschudin | 165/48 |
| 3,698,472 | 10/1972 | Gold et al. | 165/6 |
| 3,793,931 | 2/1974 | Wild | 98/96 X |
| 3,952,947 | 4/1976 | Saunders | 237/1 A |
| 3,977,466 | 8/1976 | Johansson | 165/7 X |

FOREIGN PATENT DOCUMENTS

2632434  2/1977 Fed. Rep. of Germany .......... 98/99 R
7703613  10/1977 Netherlands ................. 52/171

*Primary Examiner*—Albert W. Davis, Jr.
*Assistant Examiner*—Margaret A. Focarino
*Attorney, Agent, or Firm*—Neil F. Markva

[57] ABSTRACT

The present invention refers to a heating and air-conditioning system for one or multi-storied buildings with multi-glazed windows contained in the facade of the building. A fresh air entrance arrangement is disposed below at least one of these windows on the outside of the facade of the building. A fresh air processing device is connected to the fresh air entrance arrangement with means to filter, heat or cool and humidify the fresh air and to expel the same over a distributing cavity arranged beneath the window. The distributing cavity is connected to a window cavity between the panes of the multi-glazed windows. An entrance opening arranged at the top end of the window, connected to the window cavity, extends over a good part of the width of the window and opens out toward the room to be air conditioned. A stale air flow out arrangement controlled by valves directs stale air out of the room.

7 Claims, 2 Drawing Figures

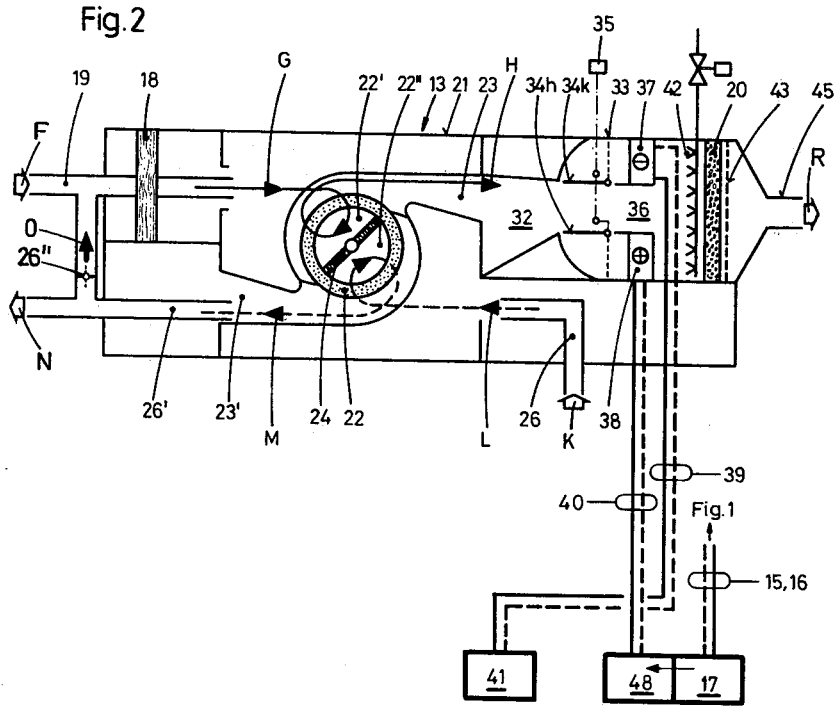

HEATING AND AIR-CONDITIONING SYSTEM

BACKGROUND OF THE INVENTION

Today's usual heating and air-conditioning systems are mostly so-called high-pressure induction systems for a whole house. There is a central air processing system which does not, however, process the total air quantities of fresh-air and stale air but only a part thereof; namely, the fresh-air taken in from outside. In this central air processing system, the fresh-air is filtered and pre-heated, or as necessary, pre-cooled and humidified. A fresh air ventilator conducts the intaken fresh-air over an insulated channel system to so-called air re-treatment units in which the fresh-air is mixed with the stale air, that is with the air already in the system, and is re-heated or re-cooled as necessary. The amount of fresh-air, hereafter also called primary air, is so selected that it is approximately equal to the air which should be renewed which is in the room adjoining the system. The air to be renewed is extracted by a ventilator and conveyed into the open. The recovery of the heat contained in the expelled air can be carried out by a heat exchange aggregate which serves to preheat the fresh air.

There are many disadvantages of systems with a central air processing arrangement of this type which require a relatively large amount of planning. Exact coordination of the work to be carried out by heating/air conditioning experts, sanitary installation workers and electricians is necessary. A relatively large amount of space is required by the air processing system and air channels and, in view of the air channels, most often being covered by higher rooms. There is a greater transmission of noise from room to room over the air channels. Furthermore, the entire system must operate fully even if only certain rooms in the building should be air conditioned.

SUMMARY OF THE INVENTION

The object of the present invention is to produce an economical heating and air-conditioning system which allows an individual or selective heating and air-conditioning of single rooms or additional adjoining rooms without losing the advantages of central operating systems with respect to the utilization of the heat or cold content of the air streaming from the system.

The heating and air-conditioning system of the invention described herein is for one or more storied buildings with multi-glazed windows contained in the facade of the building. A fresh air entrance arrangement is disposed below at least one of these windows on the outside of the facade of the building. A fresh air processing mechanism is connected to the fresh air entrance arrangement with means to filter, heat or cool and humidify the fresh air and to expel the same over a distributing cavity arranged beneath the window. The distributing cavity is connected to a window cavity between the panes of the multi-glazed windows. An entrance opening arranged at the top end of the window is connected to the window cavity, extends over a good part of the width of the window and opens out toward the room to be air conditioned. A stale air flow out arrangement controlled by valves directs stale air out of the room. The fresh-air entrance arrangement includes a first heat exchange device located outside the window to condition the fresh air as desired. The fresh-air processing mechanism has a second heat exchange means for effecting a heat transfer between the stale air and the incoming fresh air.

The advantages of this type of heating and air-conditioning system lie especially in the small outlay of planning and co-ordination necessary for the disposition and erection of the system. The component parts and units required can be standardized to a large extent. Hardly any air channels for fresh air and stale air are necessary in the room so that the height of the room is practically the same as that of the story. The operational time and the operational data such as temperature, humidity, air turnover etc, can meet individual demands. The energy contained in the outflowing air is for the main part recovered in the heat exchange aggregate, and the remaining heat is utilized in the area of the window breast. The air flows afterwards, forming an air curtain, out over the outside of the facade, thus allowing a further improvement in the energy conservation, especially in buildings of several stories.

Such a heating and air-conditioning system differs basically from heating systems using the sun's heat which often comprise an air circulation between the plates of multi-glazed windows but do not comprise heat-recovery from the stale air. The sun collector included in the explanation of the present invention is, therefore, to be considered as an additional source of heat for a heating system, which over a longer period of time during a year can supply enough heat-energy for heating and air-conditioning purposes.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 2 is a schematic view of a heat exchange aggregate used according to FIG. 2 in the system.

DETAILED DESCRIPTION

Figure 1:
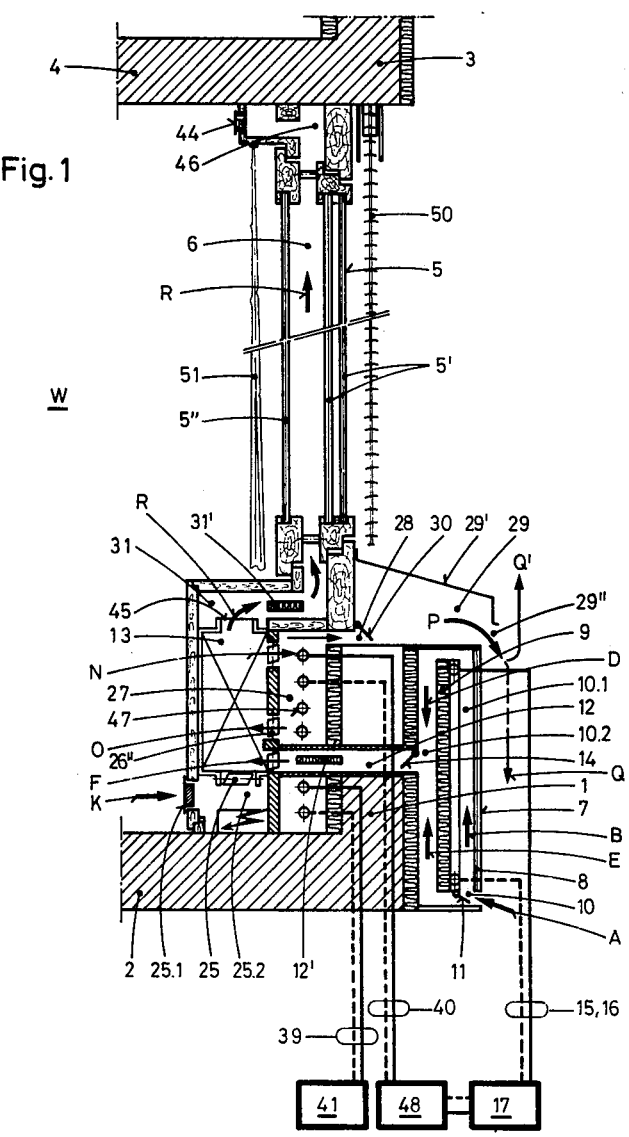
FIG. 1 is a schematic cross-sectional view partly in block form and showing a heating and air-conditioning system in connection with a 3-fold glazed window and a sun-collector arranged underneath the window on the outer side of the facade.

FIG. 1 shows a window breast 1 of a building, a floor 2, the outer facade 3 of the same building and a ceiling 4 of the same. Over window breast 1 is a 3-fold glazed window 5 having outer glass areas 5' arranged as pivotable integral parts of the window with an inner glass area 5" movably disposed, preferably pivotably, with respect to outer glass areas 5'. Between outer glass areas 5' and inner glass area 5", air streams through an air streaming channel 6 from air blown in the room W in a manner described later.

On the outside of window breast 1, a fresh air entrance arrangement 7 comprises a sun-collector 9 within a facade element which is at least nearly formed as a prismatic hollow body and behind a good heat-conducting front covering element 8. On the lower end of front covering element 8 is a fresh air entrance region 10 which preferably extends over the whole width of sun-collector 9, or, if this is absent, over the whole width of front cover 8.

A pivotable air flow directing valve 11 can be brought into an intermediary position and determines the path of fresh air with its access marked by arrow A. In the position shown in FIG. 1, valve 11 causes the main part of the fresh air to stream upwardly in the direction of arrow B, between front cover 8 and sun collector 9, then behind sun collector 9 downwardly in the direction of arrow D. Thus, the fresh air is preheated and flows over a fresh-air entrance channel 12 into the heat exchange aggregate 13 shown in detail in FIG. 2.

Channel 12 comprises a stop shutter or check valve 14 which opens according to the required amount of air inflowing. When none of the freah-air stream should reach heat exchange aggregate 13, stop shutter 14 will automatically close and the amount of energy falling on sun-collector 9 is fully used to heat the heat exchange medium located therein. The heat exchange medium in sun-collector 9 circulates over conductions 15 and 16, one of which is shown by a continuous line and the other by a dotted line. A sun-energy storage means 17 is connected to a heating system 48 via conductions 15 and 16 with heat being transferred from sun-collector 9.

If, for example in summer, the fresh air temperature is higher than that of the air in the room to be air-conditioned, additional warming of the primary air as described above is undesirable. The directing valve 11 behind fresh air entrance region 10 is then pivoted upwardly in a clockwise direction and the primary air streams are directed behind sun-collector 9 in the direction of arrow E through streaming channel 10.2 and into entrance channel 12. Intermediary positioning of valve 11 allows the temperature of the primary air to be generally adapted to the required room temperature before entering the heat exchange aggregate 13. Thus, it is evident that not only the stream directing means comprising valve 11 but also the stream choke means comprising stop shutter 14 are controlled thermostatically and/or by reason of the required turnover of fresh air.

The entrance channel 12 connects the fresh air supply means described above with the heat exchange aggregate 13, details shown in FIG. 2. The entrance arrows F are identical in FIGS. 1 and 2. FIG. 2 shows primary air coming over fresh air entrance channel 12 (FIG. 1) in the direction of arrow F over a supply line 19 and streaming firstly through a dust filter 18. From filter 18, primary air flows to a De-Vries ventilator heat exchanger 21 shown schematically in FIG. 2. Heat exchangers of this sort include a longitudinally hollow-cylindrical drum 22 having air-permeating walls and disposed between two separated spiral casings 23 and 23'. Drum 22 is separated into two equal halves by a stationary separating wall 24 into which each one side suction opening (not shown) opens out. One suction opening is allocated to the fresh air stream and the other to the warm stale air stream which must be kept separate from the fresh air stream. Drum 22 is rotatable clockwise in casings 23 and 23' and is made mainly of a polyurethane supporting body with the character of a coarse filter. The polyurethane supporting body preferably comprises a metal grating as a heat exchange medium. The metal grating is preferably made of lengthwise heat exchanging rods with knitted wire inserted in it. Drum 22 is driven by a motor (not shown) with adjustable speed. Wall 24 divides drum 22 lengthwise into two separate suction chambers 22' and 22" in respective spiral casings 23 and 23'. The rotating heat exchange drum thus controls the air through-put based on its speed of rotation as is well known.

The fresh air sucked in the direction of arrow G into suction chamber 22' passes through drum wall 24 and is expelled in the direction of arrow H out of heat exchanger 21. Separating wall 24 between suction-chambers 22' and 22" keeps the fresh air stream F-G-H from mixing with the warm stale air stream K-L-M described below.

FIG. 1 shows stale air stream as arrow K entering over an entrance grating 25.1, a suction space 25.2 and through a stale air entrance valve 25 into the lower end of heat exchange aggregate 13. FIG. 2 shows this arrangement as feed line 26 above arrow K. This "used" or stale room air streams according to arrow L into suction chamber 22" and passes through drum wall 24 by the centrifugal action of rotating drum 22. While passing through drum-wall 24, the stale air is, on the one hand, coarsely filtered and, on the other hand, releases a good part of its heat content to the heat exchange rods in drum 22 and to the wire grating contained therein.

The heat released from the stale air to the heat exchange rods and wire grating in drum 22 is transported in the longitudinal section of drum 22 which is passed through by air stream F-G-H and there warms the fresh air coming from filter 18. Separating wall 24 prevents mixing of the fresh air and stale air streams as noted above. Thereby, a transmission of heat over the heat exchange rods (not shown) and the wire grating in revolving drum 22 between the two air streams takes place. The stale air leaves heat exchange aggregate 21 via spiral casing 23' over a feed line 26' in the direction of arrow N identically shown in FIGS. 1 and 2. The stale air can be mixed completely or partly with the fresh air stream F-G-H over a more or less open valve 26" as circulating air in the direction of arrow O.

According to FIG. 1, the air streams in the direction of arrow N into a stale air flow-off cavity 27 located in the facade of the building particularly in the window breast. Flow-off cavity 27 adjoins a stale air exit chamber 29 over a connection channel 28. Chamber 29 is shown here defined by a rain shield 29'. The stale air streams through chamber 29 in the direction of arrow P to outside. Shutter or valve 30 is disposed at the outer end of the connection channel 28 and has a free entrance cross-section controlled by the pressure in the air-conditioned room W. Thus, shutter 30 closes automatically when no stale air is present.

On the outside of the facade, the stale air streams according to arrow Q or Q', upwardly or downwardly depending on the outside temperature. Generally, the air streams upwardly with heating operation (winter) and falls downwardly on cooling operation (summer). Thus, a corresponding warm or cooler air layer can be achieved directly on the facade.

After the primary air has left spiral casing 23 in heat exchange aggregate 13 in the direction of arrow H, it enters a hollow body 32 in front of an air-conditioning section 33. Section 33 comprises a pair of air shutters 34k and 34h driven over a rod linkage system by a servo-motor 35. Air shutters 34h and 34k are shown in their closed position in which the fresh air is led exclusively to a passageway 36.

Parallel to passageway 36, cooling and heating zones 37 and 38 are arranged to which the fresh air stream can be led as desired completely or partly depending on the position of the shutters 34h and 34k. The cooling and heating zones 37 and 38 are supplied by lines 39 and 40. Lines 39 lead to a cooling machine 41 shown in block form, and lines 40 lead to a heating block 17/48 already mentioned. The cooling and heating zones 37 and 38 are formed as heat exchangers and can be constructed in the normal way. Shutters 34k and 34h are adjusted by the thermally controlled servo-motor 35 depending on the temperature of the oncoming fresh air (arrow H) and the required room temperature in the air-conditioned room W. The oncoming fresh air may be led directly to passageway 36 (without heating or cooling), or at least partly led to cooling zone 37 or at least partly to heating zone 38. Shutters 34k and 34h are therefore so adjustable that a part of the fresh air can always stream through passageway 36 "untreated."

After passing through passageway 36, the air reaches a known type humidifier 42 schematically shown here as a spray device. An active carbon filter 20 is arranged on humidifier 42 if the fresh air is often loaded with bad smells.

Finally, the fresh air passes through a distributing device 43 shown as a perforated metal sheet to obtain the most even distribution of the fresh air which leaves through exit opening 45 in the direction of arrow R. Fresh air exit opening 45 directs air into a cavity 31 in the window breast. Cavity 31 is connected to air streaming channel 6 in window 5. The fresh air streams in direction R through the streaming channel 6 toward an exit chamber 46 arranged at the top end of window 5. Exit room 46 comprises an opening 44 which faces room W to be air-conditioned and has a so-called air supply grill through which the fresh air stream is blown into room W to be heated and air-conditioned.

Cavity 31 can be arranged as a fresh air distributing channel when there are several adjacent windows 5 in the same room or several adjacent rooms included in a heating and air-conditioning system according to the present invention. Thus, it is possible to connect rooms to be air conditioned which are adjacent to the room in which the described system is arranged with the heat exchange aggregate 13. It is also possible to include windows (not shown) in the heating and air-conditioning system which lie on the opposite wall of room W. In such an instance, fresh air channels (also not shown) are led either from cavity 31 in the window breast or from exit room 46 in front of exit opening 45 to the underside of the opposed window, which is formed in the same way as or similarly to window 5. It is understood that with this type of arrangement of the subject matter of the present invention, chokes or adjusting means are to be installed to achieve even fresh air distribution everywhere.

Further, according to the present invention, rooms which lie below or above the room which contains the heat exchange aggregate 13 may be supplied with treated air. But with all the embodiments where additional rooms are included in the supply range, it is absolutely necessary for rational operation that air channels also lead back from these rooms to the heat exhange aggregate 13.

As shown in FIG. 1, supply and removal pipes 47 can be arranged in the stale air flow-off cavity 27 for the heat and cold media used in the air conditioning section 33 (FIG. 2). Noise suppression means 12' and 31' may be installed, respectively, in the fresh air entrance channel 12 and cavity 31 in the window breast.

A sun-blind 50 may be disposed outside window 5 to achieve optimum operation of the heating and air-conditioning system according to the present invention. Sun-blind 50 may be a clear polyester foil vapor-blasted with aluminum in high vacuum. Depending on the thickness of the vapor-blasting, the foil may reflect 99% of the sun's radiation energy. On the other hand, the aluminum vapor-blasting leaves a practically uninterrupted view to the outside. It is understood, that other constructions of sun-blinds, e.g., a lamellar blind, can also be used. A curtain 51 can be hung on the inside of window 5 underneath air supply grill 44.

What we claim is:

1. Heating and air-conditioning system for one or multi-storied buildings with multi-glazed windows contained in the facade of the building, a fresh-air entrance arrangement arranged below at least one of these windows on the outside of the facade of the building, a fresh-air processing device connected to the fresh-air entrance arrangement with means to filter, heat or cool and humidify the fresh air and to expel the same over a distributing cavity arranged beneath the window, this cavity being connected to a window cavity between the panes of the multi-glazed window, an entrance opening arranged at the top end of the window, connected to the window cavity, extending over a good part of the width of the window and opening out toward the room to be air conditioned, and a stale air flow out arrangement controlled by valves, characterized in that,
   (a) the fresh-air entrance arrangement (7) comprises a first heat exchange device (9) arranged on the outside of the window inter- and disconnected by air flow directing (11) and shutter means (14), and a fresh-air entrance opening (10) extending over at least a large part of the width of a window, and fresh-air processing device (13) connected to a fresh-air entrance channel (12) which passes through the window breast (1),
   (b) the fresh-air processing device (13) lies underneath at least one of the mentioned windows (5) at the inside of the window breast opposite the fresh-air entrance arrangement and comprises a second heat exchange device (21, FIG. 2) which is flowed through by the total fresh air stream and the total stale air stream, these being kept separate from one another,
   (c) that in the direction of the stale air stream there are means in front of, in and behind the fresh air processing device for suction, heat recovery from the stale air and to expel the stale air from the air-conditioned room over a separate streaming path (K-25/26, L-M-N-P), these means comprising a stale air flow-off cavity (27) in the region of the facade wall beneath the window, a connection channel (28) closable at its exit end by a shutter (30) and an adjacent stale air exit chamber (29) with an opening (29'') leading to the facade side, whereby the releasable shutter (30) at the end of the entrance cross section of the connection channel (28) is controlled dependently on the pressure in the air conditioned room (W) and
   (d) that the stale air flow-off cavity (27) has opposite the fresh air processing device (13) a releasable entrance opening (26'') over which the stale air can be partly or completely lead back to the entrance of the fresh air processing device.

2. Heating and air-conditioning system as defined in claim 1, wherein
   the fresh-air entrance arrangement (7) is a hollow facade element on the outside of the wall of the building,
   the front covering element (8) of said facade element is made of good heat-conducting material,
   the first heat exchange device is a sun collector (8) integral with the heating and air-conditioning system and arranged at a distance from the hollow body walls, streaming channels (10.1, 10.2) are arranged between the front covering (8) and the front side of the sun collector (9), between its back side and the window breast (1), between the lower end of the front covering (8) and the lower limit of the facade element there is an air entrance opening (10), and the fresh air entrance channel (12) goes out from said streaming channel (10.2) between the back side of the sun collector (9) and the window breast (1), between the top and bottom limits of the facade element of the sun collector (9).

3. Heating and air-conditioning system as defined in claims 1 or 2, wherein the air flow directing means of the fresh air entrance arrangement is a movable valve (11) joining partly or totally either the streaming channel on the front side (10.1) and/or the back side (10.2) of the sun collector (9) with the air entrance opening (10), said valve controlling the parts of the fresh air amount circulating in front of and behind the sun collector, the stream choke means is a stop shutter (14) movably arranged in the fresh air entrance channel (12).

4. Heating and air-conditioning system as defined in claim 1, wherein the fresh air processing device comprises a heat exchanger (21) with a rotating heat exchange drum (22) to control the air through-put.

5. A heating and air-conditioning system for one or multi-storied buildings with multi-glazed windows having a window breast and being contained in the facade of the building, said system comprising:

(a) a fresh air entrance arrangement disposed below at least one of said windows on the outside of the facade of the building, (b) an air distributing cavity located beneath the window and connected to an air streaming channel between the panes of the multi-glazed window, (c) a fresh air processing means connected to the fresh air entrance arrangement and including means to filter, heat or cool and humidify the fresh air and to expel the same over said air distributing cavity, (d) an air entrance opening located at the top of the window, connected to the window cavity, extending over a portion of the width of the window and opening out toward the room to be air conditioned, (e) a stale air flow out arrangement controlled by valves, (f) the fresh air arrangement including a first heat exchange device located outside the window, (g) a fresh air entrance channel passing through the window breast to effect the connection of the fresh air entrance arrangement and the fresh air processing means, (h) the fresh air processing means being disposed underneath at least one of said windows at the inside of the window breast and including a second heat exchange device which is effective to maintain separate the total fresh air stream and the total stale air stream flowing therethrough, (i) the stale air flow arrangement including a stale air flow-off cavity in the region of the facade wall beneath the window and means for controlling the flow of stale air dependent on the pressure in the air conditioned room, and (j) the stale air flow-off cavity including a releasable entrance opening through which stale air may be lead back to the fresh air processing means.

6. A heating and air-conditioning system as defined in claim 5 wherein the fresh-air entrance arrangement includes a hollow body having walls and a front covering element composed of good heat-conducting material, the first heat exchange device comprising a sun collector located at a distance from the hollow body walls, a streaming channel extending between the front covering element and the front side of the sun collector and between the back side of the sun collector and the window breast, an air entrance opening located between the lower end of the front covering and the lower limit of the hollow body covering element.

7. A heating and air-conditioning system as defined in claims 5 or 6, wherein the fresh air entrance arrangement includes valve means for controlling the parts of the fresh air amount circulating in front of and behind the sun collector.

* * * * *